D. F. CURTIN.

BLANK FOR PAPER CUPS.

APPLICATION FILED MAR. 25, 1922.

Reissued June 13, 1922. 15,381.

Witnesses
J. W. Angell
Charles W. Ellis Jr.

Inventor
David F. Curtin
by Charles W. Ellis Atty.

UNITED STATES PATENT OFFICE.

DAVID F. CURTIN, OF CHICAGO, ILLINOIS.

BLANK FOR PAPER CUPS.

15,381. Specification of Reissued Letters Patent. Reissued June 13, 1922.

Original application filed September 22, 1914, Serial No. 862,871. Renewed November 11, 1915, Serial No. 60,996. Original No. 1,188,048, dated June 20, 1916. Application filed for reissue March 25, 1922. Serial No. 546,907.

*To all whom it may concern:*

Be it known that I, DAVID F. CURTIN, a citizen of the United States, and a resident of Chicago, in the county of Cook and State of Illinois, have invented a new and useful Improvement in Blanks for Paper Cups, of which the following is a specification.

My invention is an improvement in blanks for paper cups, and has for its object to provide a blank of paper of suitable form for forming a paper cup, for holding soda or other soft drinks, wherein the blank is so shaped that it may be formed into a cup of conical shape in the machine forming the subject-matter of my co-pending application Serial No. 862,175, filed September 17th, 1914.

The blank forming the subject-matter of the present invention is cut from paper, which may be treated with paraffin if desired or which may be plain in accordance with conditions and the blank 1 is of approximately quadrantal form.

Figure 2:
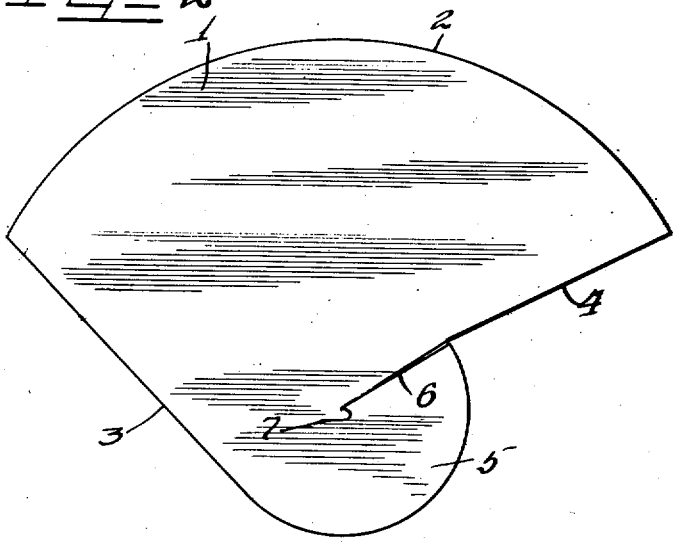
Figure 2 is a top plan view of the blank from which the cup is formed.

The blank as shown in Figure 2, has a curved edge 2, and straight edges 3 and 4, and the blank is provided with a semi-circular extension 5, at the side 4. The extension 5 is integral with the body of the blank 1, but the said extension is partially separated from the body of the blank by means of a slit or cut 6. This slit or cut 6 extends from the side 4 but is not in alinement with the said side, that is, the slit is not a straight continuation of the said side. The slit 6 extends at an obtuse angle to the side 4, and the slit is of a length equal to one-half of the diameter of the extension. That is, the slit 6 extends from the center of the extension 5 to that edge of the said extension which would join the side if the slit were not made.

The edge 3 makes a considerable angle with the radius of the arc 2 that goes through the end of the edge 3. This gives a considerable distance between the edge 3 and the center of the arc 2. The edge 4 on the other hand, is nearly coincident with the radius of the arc 2 going through the end of 4. The line of the edge 4 thus passes close to the center and, even if the edge 4 and the side of the cut 6 continuous with the edge 4 be regarded as together forming one edge, the line of this edge—that is, the line giving its general direction—does not pass far from the center.

The end of the cut 6 is near to the center, being at the center of the semi-circular edge of 5. The extension 5 is therefore joined to the main body of the blank between the center and the edge 3. The extension and the main body merge along this junction not being definitely separated by any physical demarkation. The cut 6, however, forms a cleft that partially separates the extension from the main body of the blank and so there is no merging of the two at the right (as shown in Figure 2) of the center.

The side 3 of the body 1 of the blank merges into the curved edge of the extension, being continuous therewith. The blank arranged as above described is formed into a conical cup, with the edges 4 and 3 lapping upon each other, and with that side of the blank adjacent to the edge 3 outside of that portion adjacent to the edge 4. The extension 5 is lapped around the apex of the vessel formed in this manner, and the free end of the said extension may be provided with an adhesive if desired to cause the said free end to adhere to the outer surface of the blank 1 to hold the cup in formed position.

The blank 1 is somewhat greater than a quadrant, the center of the blank being at or near the center of the extension 5. The center of the arc 2, the end of the cut 6 and the center of the semi-circular edge of the extension 5 are all close together and are indicated by one reference numeral. This central point indicated at 7 is the apex of the vessel or cup when the blank is formed, and all of the extension 5 and a portion of the body of the blank 1 is wrapped around the apex as shown in Figure 1 to reinforce and strengthen the vessel at this point.

It is obvious that that portion of the blank adjacent to the edge 3 might be provided with an adhesive if desired to make the said edge adhere closely to the face of that portion of the blank adjacent to the edge 4.

Figure 1:
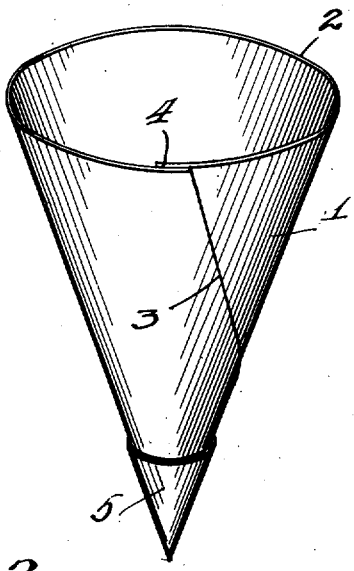
Figure 1 is a perspective view of the cup.

It will be noticed from an inspection of Figure 1, that a sufficient portion of the blank adjacent to the edge 3 is lapped upon the edge 4 to provide a secure connection at the said edge. The holders with which the cups are intended to be used are of conical form, and of such size that the blank when in the cup will fit smoothly within the holder. Thus the holders serve also to strengthen and reinforce the cup.

The machine above referred to consists of two conical dies, around one of which the blank is folded to form the cup, the other acting as a counter-pressing device to assist in the formation.

I claim as my invention:

1. A blank for forming conical vessels, said blank being of approximately quadrantal form, and having a curved and two straight edges, said blank having a semicircular segmental extension at one of the straight edges and having its diameter approximately in line with the other straight edge, the first-named straight edge being continuous with the curved edge of the extension, said blank having a slit extending from the junction of the curved edge of the extension with the last-named straight edge to the center of the diameter of the extension, and the said center being at approximately the center of the circle upon whose arc the curved edge of the body of the blank is formed.

2. A blank for forming conical vessels, said blank being of approximately quadrantal form, and having a curved and two straight edges, said blank having a semicircular segmental extension whose curved edge is continuous with one of the straight edges at the end remote from the curved edge of the body of the blank and whose diamater is continuous with the other straight edge of the blank, said extension being partially separated from the body of the blank at the last-named straight edge.

3. A blank for forming conical vessels, the blank being of approximately quadrantal form having a curved and two straight edges, and the said blank having an extension between the adjacent ends of the straight edges, said extension being partially separated from the blank at one of the straight edges.

4. A blank for forming a conical vessel, said blank having a main body and an extension, the main body having a curved edge and two approximately straight edges, the latter making different angles with the radii running to their respective outer ends, the extension protruding in the general direction of one of said approximately straight edges beyond the line of the other approximately straight edge.

5. A blank for forming a conical vessel, said blank having a main body and an extension, the main body having a curved edge and two approximately straight edges, the latter making different angles with the radii running to their respective outer ends, the extension protruding in the general direction of one of said approximately straight edges beyond the line of the other approximately straight edge, the periphery of the whole blank including a reentrant portion one part of which is formed by said last-named approximately straight edge and another part of which is a portion of the periphery of the extension whereby said main body and said extension are on different sides of said reentrant portion and are partially separated thereby.

6. A blank for forming conical vessels, the blank being approximately quadrantal but having its approximately radial edges at different angles to the radii to their respective outer ends, said blank having an extension between the inner ends of the approximately radial edges and also having a cleft entering it from the corner between said projection and the more nearly radial edge.

7. A blank for forming conical vessels, said blank having one edge in the form of the arc of a circle and two other edges, one of said last-named edges being approximately straight and the distance between the line of said edge and the center of said arc being less than the distance between said center and the other edge, said blank also having a projection, said projection merging with the rest of the blank in the space between said center and said last-named edge.

8. A blank for forming a conical vessel, said blank having a main body and an extension, the main body having a curved edge and two approximately straight edges, the latter making different angles with the radii running to their respective outer ends, the extension protruding in the general direction of one of said approximately straight edges beyond the line of the other approximately straight edge, the periphery of the whole blank including a reentrant portion one part of which is formed by said last named approximately straight edge and another part of which is a portion of the periphery of the extension whereby said main body and said extension are on different sides of said reentrant portion and are partially separated thereby, said reentrant portion of the periphery of the whole blank forming an acute angle at its inward apex.

9. A blank for forming conical vessels, said blank having one edge in the form of the arc of a circle approximately a quadrant, the blank having two other edges which make different angles with the radii to their respective outer ends the one of said edges making the larger angle with the radius to its outer end continuing beyond the line of the other edge, said continued portion forming a part of the periphery of a projection the other end of the periphery of said projection meeting the innermost part of the other of said two edges at an acute angle.

In witness whereof, I have hereunto subscribed my name in the presence of two subscribing witnesses.

DAVID F. CURTIN.

Witnesses:

LAWRENCE REIBSTEIN,
HENRY WESTCOTT WALKER.